United States Patent [19]

Kayanuma et al.

[11] Patent Number: 4,870,249

[45] Date of Patent: Sep. 26, 1989

[54] ELECTRIC FUEL HEATING DEVICE

[75] Inventors: Kazuo Kayanuma; Kazuo Sasaki, both of Suntougun, Japan

[73] Assignee: Texas Instruments Incorporated, Dallas, Tex.

[21] Appl. No.: 53,988

[22] Filed: May 26, 1987

[51] Int. Cl.$^4$ .................. H05B 3/12; F02M 31/12
[52] U.S. Cl. ...................... 219/206; 123/549; 123/557; 219/275; 219/301; 219/375; 219/505; 219/530; 219/541; 261/142; 338/22 R
[58] Field of Search .................. 219/205-207, 219/307, 375, 381, 382, 504, 505, 540, 541, 530, 275, 271, 301; 338/22 R; 123/549, 557; 261/142

[56] References Cited

U.S. PATENT DOCUMENTS

| | | | |
|---|---|---|---|
| 4,361,125 | 11/1982 | Igashira et al. | 261/142 X |
| 4,390,000 | 6/1983 | Igashira et al. | 123/549 |
| 4,395,994 | 8/1983 | Goto et al. | 219/206 X |
| 4,407,254 | 10/1983 | Kato et al. | 123/549 |
| 4,489,232 | 12/1984 | Wada et al. | 123/549 |

FOREIGN PATENT DOCUMENTS

| | | | |
|---|---|---|---|
| 57-97060 | 6/1982 | Japan | 123/549 |
| 58-211558 | 12/1983 | Japan | 123/549 |
| 2143708 | 2/1985 | United Kingdom | 123/549 |

*Primary Examiner*—Anthony Bartis
*Attorney, Agent, or Firm*—James P. McAndrews; John A. Haug; Melvin Sharp

[57] ABSTRACT

A fuel heating device comprises an electroconductive inner tube which forms a passageway for fuel to be heated. A heater having a positive coefficient of resistance (PTC) is fixed to the side of the outside surface of this electroconductive inner tube, a resilient electrode contacts this heater from the side of its outside surface, and a first electrically and thermally insulating outer tube is provided around the entire periphery of the aforementioned electroconductive inner tube to cover the aforesaid heater completely for holding the electrode compressed to the heater. A second electrically and thermally insulating outer tube is provided around the entire periphery of the first tube, said second tube including means for mounting the device for use.

2 Claims, 3 Drawing Sheets

ELECTRIC FUEL HEATING DEVICE

BACKGROUND OF THE DISCLOSURE

This invention relates to a fuel heating device and to a device which is suitable as the initial stage in a fuel evaporation system (the carburetor part) of an automobile using gasoline as its fuel. In the conventional fuel system of automobiles, gasoline is atomized, a suitable amount of air is supplied automatically if it is required, for converting the same into a combustible gas (mixed gas), and this combustible gas is then supplied to the cylinder of the engine. A carburetor is used for the purpose of obtaining such a mixed gas of air and gasoline. In some known systems, this mixed gas of atomized gasoline and air is preheated by a honeycomb heater as it is led to the cylinder of the engine. A large number of gas passageways are compactly formed in the honeycomb heater and, when the heater is given an electric current, the mixed gas that passes it is heated to a prescribed temperature so as to prevent knocking or to economize the fuel consumed. The honeycomb heater is ordinarily constructed so that the passage of electricity may stop when the temperature of the engine rises.

In some systems, a cylindrical down tube heater is also provided below the honeycomb heater to be used for the evaporation of the liquid fuel that flows down along the surface of the inner wall of the mixed gas passageway. When this down tube heater is activated, the honeycomb heater is not used, and when the honeycomb heater is operated, on the other hand, the down tube heater will not be activated, only one of the heaters being operated in ordinary cases.

The down tube heater that is used here is typically such that a dual tube consisting of an inner tube and an outer tube made of a metal is formed, with a heater (such as a PTC ceramic heater) being charged between these tubes. In such a heater, where the outer tube is formed by a metal whose heat conductivity is high, the heat coming from the heater that is charged between the two tubes tends to be dispersed unnecessarily outside of the heater (outer peripheral direction), with a result that the thermal efficiency for fuel heating on the side of the inner periphery which is important becomes unsatisfactory. The heating efficiency on the side of the inner periphery is not satisfactory and the efficiency of such heaters is low.

OBJECTS OF THE INVENTION

The purpose of this invention lies in offering a fuel heating device with increased heating efficiency.

Another purpose of this invention lies in offering a fuel heating device which can be easily assembled and incorporated.

BRIEF SUMMARY

This invention relates to a fuel heating device in which an electroconductive inner tube defines a passageway for fuel that is to be heated. One or more electric heaters are fixed to the side of the outside surface of this electroconductive inner tube, and an electrode, preferably a resilient electrode fitting around the heaters contacts each heater from its outside surface. An electrically and thermally insulating first outer tube is provided around the entire other periphery of the aforementioned electroconductive inner tube in such a manner as to cover the heaters completely so that the electrode is compressed to against the heaters, and a second electrically and thermally insulating outer tube is provided around the entire outer periphery of this first outer tube.

In addition, in an embodiment of this invention a member that serves to mount this fuel heating device is formed integrally with second outer tube as one body.

DESCRIPTION OF PREFERRED EMBODIMENTS

Figure 5:
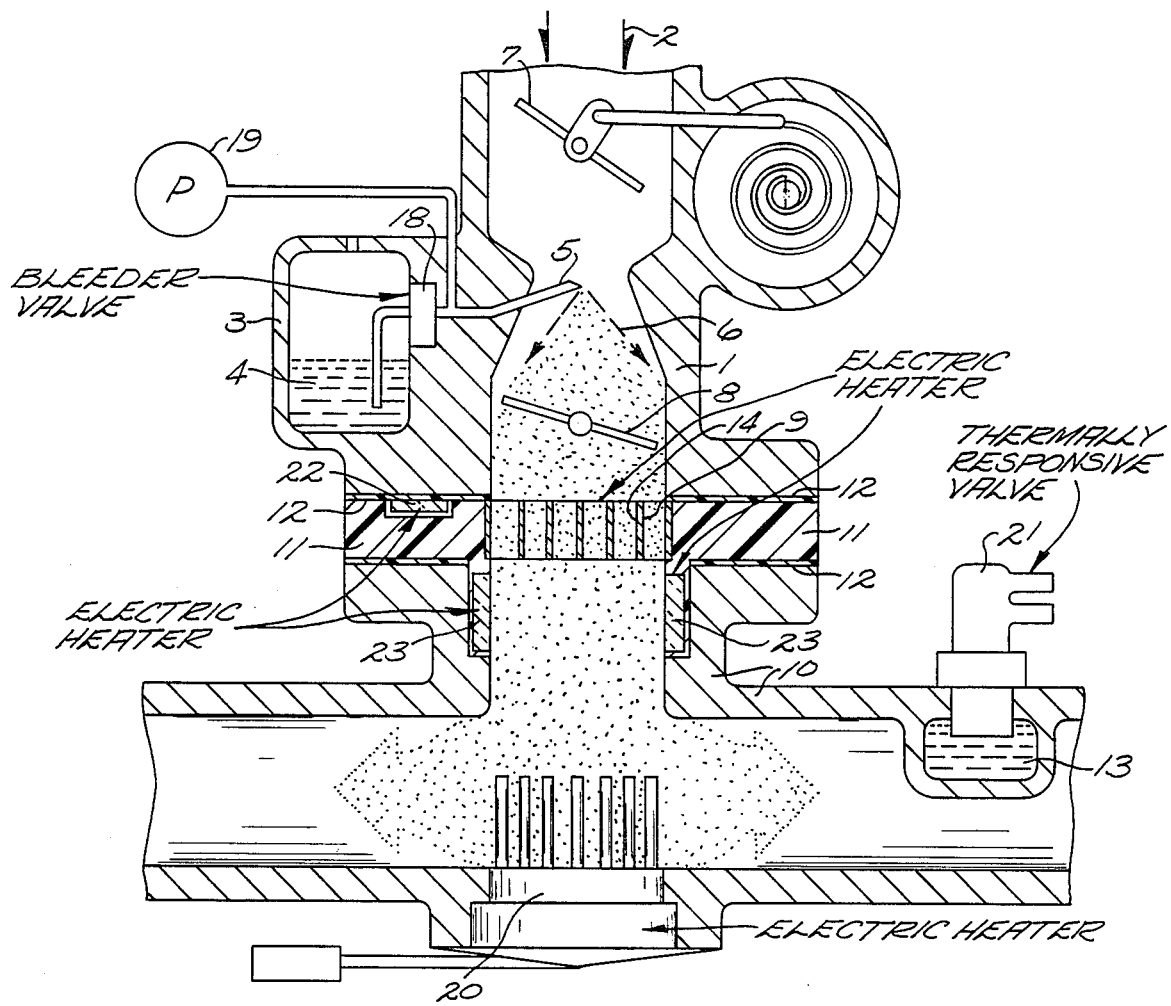
FIG. 5 diagrammatically shows a cross section of a carburetor arrangement adapted to use the device of FIG. 1.

Referring first to FIG. 5, a carburetor body 1 is formed as a Venturi pipe whose intermediate range diameter is reduced. By the air 2 that is supplied via a choke valve 7 from the air supply opening thereof, the gasoline 4 in the float chamber 3 is atomized at the tip of a nozzle 5. (In the drawing, 18 diagrammatically indicates a bleed valve and 19 is a pump.)

This mixed gas of atomized gasoline and air 6 is preheated by a honeycomb heater 9 via a butterfly valve 8 and is led to the cylinder of the engine through the branching pipe of an intake manifold 10 which has a manifold heater 20.

The carburetor body 1 and intake manifold 10 are made air-tightly secured to each other via a gasket 12, sandwiching an insulating substance (insulator) 11 that surrounds the honeycomb heater 9.

A freeze-preventive heater shown diagrammatically at 22 is provided on the insulator 11. In addition, a warm-water passageway 13 that passes warm water after the cooling of the engine is formed in the manifold 10 with a thermal responsive valve 21 being arranged in it. In addition, a large number of gas passageways 14 are compactly formed in the said honeycomb heater 9 and, when the heater is given an electric current from an electric circuit system as diagrammatically shown in FIG. 6 by reference to diagrammatically illustrated circuit components indicated at 15, 16 and 26 e.g., the mixed gas that passes it is heated to a prescribed temperature so as to prevent knocking or to economize the fuel consumed. The honeycomb heater 9 is ordinarily so constructed that the passage of electricity may stop when the temperature of the engine cooling water 27 detected as diagrammatically indicated at 26 rises (for example, if it reaches 70 degrees C.).

In FIG. 5, a cylindrical down tube heater as indicated diagrammatically at 23 for mixing evaporation purposes is provided below the honeycomb heater 9 to be used for the evaporation of the liquid (liquid fuel) that flows down along the surface of the inner wall of the mixed gas passageway. When this heater 23 is activated, the honeycomb heater 9 is not used. When the honeycomb heater 9 is operated, on the other hand, the heater 23 will not be activated, only one of the heaters 9 and 23 being operated in ordinary cases.

Figure 1:
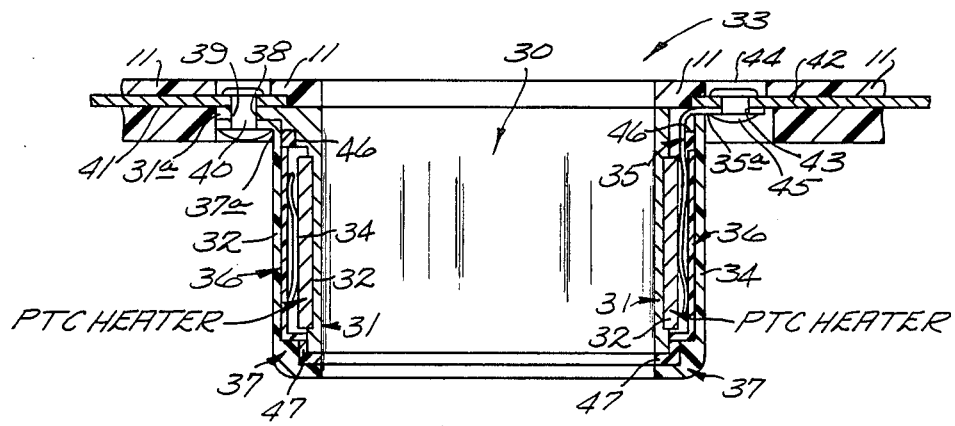
FIG. 1 shows a cross section of the down tube heater of this invention.
Figure 2:
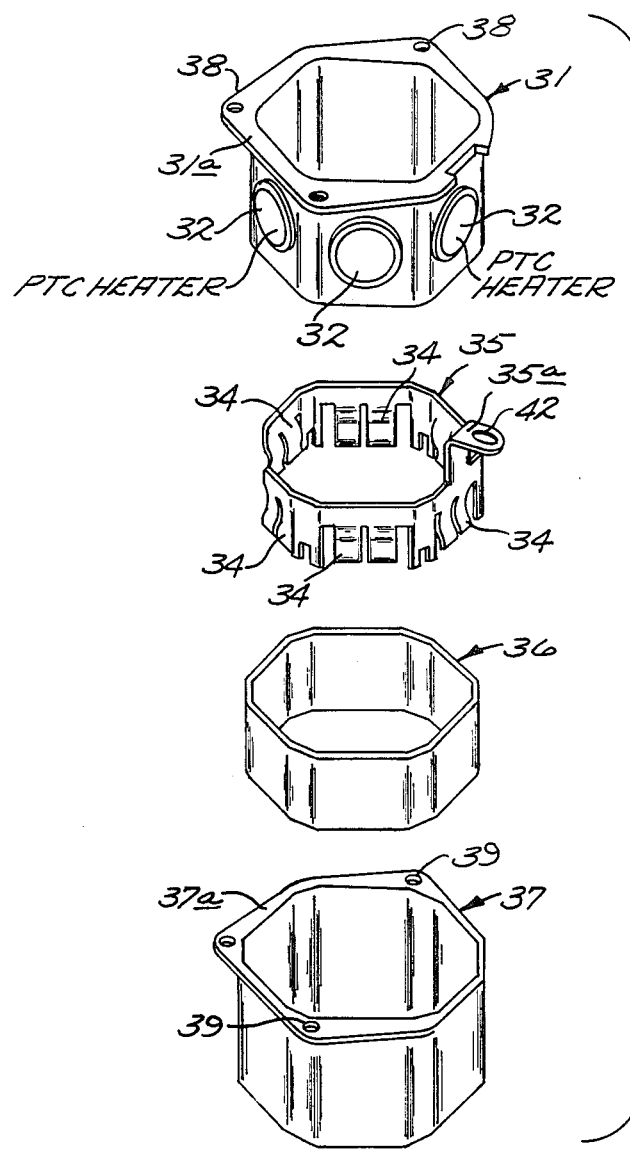
FIG. 2 is an oblique exploded view of the various constituent parts of the said heater in a dismantled state.
Figure 3:
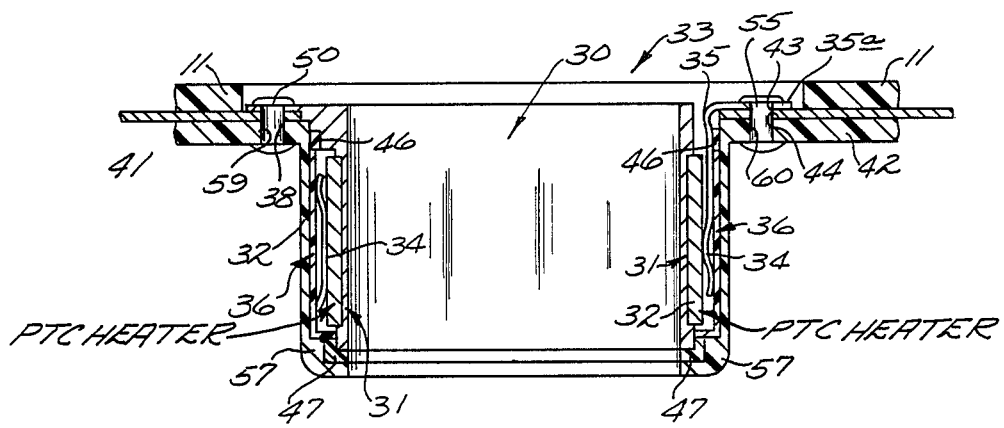
FIGS. 3 and 4 show the cross sections of the down tube heater according to other examples (with FIG. 4 being a partial section).
Figure 6:
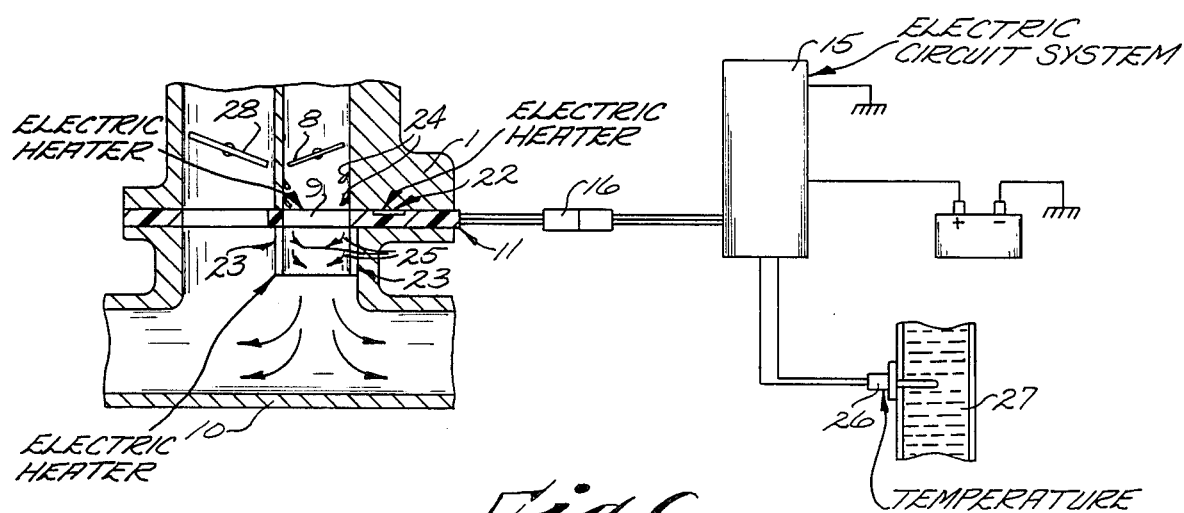
FIG. 6 is an outline of an electrical circuit system for the heating device of this invention.

In accordance with this invention as shown particularly in FIGS. 1-3, an improved down tube heater 33 corresponding to aspects of the freeze preventative and down tube heaters 22 and 23, and adapted to be disposed at the location diagrammatically indicated by the heaters 22 and 23 in FIGS. 5 and 6, is fixed to an insulator 11 which is provided between the carburetor 1 and the intake manifold 10 as described earlier with respect to heater 23, and the insulator 11 is formed with an electrically insulating and highly thermally insulating synthetic resin (such as PPS). This heater 33 has a hexagonal inner tube or cylinder 31 made of metal (such as aluminum), facing the fuel gas passageway 30, a plurality of circular ceramic heaters 32 of an electrical resistance material of positive temperature coefficient of resistivity (PTC) which are fixed to the respective flats formed on each outer surface of this inner tube, and an approximately hexagonal, electricity-supplying plate 35 has spring portions 34 fitted around the heaters 32 that are resiliently pressed to these heaters.

This electricity-supply plate 35 is pressed to the heater 32 by a synthetic resin hexagonal middle or first outer cylinder or tube 36 which is arranged in such a manner as to cover all of the various heaters 32, thereby achieving a satisfactory electric contact of the plate 35 to the heaters. On the outer periphery of this middle tube 36, there is provided a second, synthetic resin, hexagonal outer cylinder or tube 37 corresponding to the aforementioned inner tube 31 and both of the tubes 31 and 37 are mutually fixed together by driving a metal rivet 40 (refer to FIG. 1) into the rivet holes 38 and 39 which are formed on the flanges 31a and 37a of both tubes 31 and 37. At the same time, an electric source terminal 41 that has been buried in the insulator 11 is also fixed integrally to the tube 31. In this manner, the inner tube 31 made of a metal is electrically connected with the electric source via the rivet 40 and terminal 41.

One of the electrode surfaces of each of the heaters 32 is connected to the electric source by the inner tube 31 in this manner. On the other hand, the other electrode surface is electrically connected with the anodic electric source terminal 42 which is buried in the insulator 11 on an extension 35a formed by extending a part of the plate 35 having the aforesaid springs 34. This electric connection is achieved by driving a metal rivet 45 into the rivet hole 44 that is formed at the aforementioned terminal 42 as well as into the rivet hole 42 that is formed at the aforesaid plate extension 35a.

Further, there is provided a ring 46 that serves the role of a seal for positioning around the aforementioned extension 35a. In addition, a seal ring 47 is arranged between both tubes 31 and 37.

Moreover, the inner surface of the aforesaid inner tube 31 is suitably given a rough surface by the sand blast technique.

According to this example where the heater 33 is constructed in the manner described above, there is provided on the entire periphery an electrically insulating (further heat-resistant and chemical-resistant) thermally insulating, middle or first outer tube 36, made of synthetic resin, in such a manner as to cover the heater 32 completely. The entire periphery of this middle tube is covered by an outer tube, which is made of synthetic resin and which is electrically and thermally insulating and (heat-resistant and chemical resistant), as in the case of the middle tube. These tubes 36 and 37 are formed by, for example, polyphenyl sulfon (PPS) or phenol resin.

Accordingly, the heat of the heater 32 is only with difficulty diffused outside of the heater due to the existence of both tubes 36 and 37, with a result that it becomes possible to sufficiently heat the fuel that runs through the passage 30 on the inner peripheral side and that the thermal efficiency can be improved markedly.

In this case, since the aforementioned inner tube 36 covers the heater 32 completely, the heat dispersion to the outside can be more than sufficiently prevented by the multiple effect of the above along with the adiabatic or thermally insulating effect of the outer tube 37. At the same time, the contact between the spring 34 and the heater 32 can be sufficiently guaranteed by the compressive force of the plate part 34 because of this middle tube 36, with a result that the positioning of the plate parts 34 can be carried out satisfactorily.

In the above, moreover, the inner peripheral surface of the inner tube 31 is made into a rough surface, with a result that the surface area of the inner peripheral surface thereof increases and that the heat conductive area increases. Accordingly, the heat conductance efficiency (heating efficiency) to the fuel can be improved.

FIG. 3 shows another example of this invention. According to this example, the integral formation of the thermally insulating second outer tube 57 and the insulator 11 constitutes a major feature, Aside from this, the construction is basically the same as in the example shown in FIG. 1. It is mentioned in this connection that reference numeral 50 in the figure indicates the rivets that had been driven into each rivet holes 38, 39 and 55 indicates the rivet that was driven into the rivet holes 43, 44 and 60.

According to the above-described construction, the heating efficiency is improved by the existence of the thermally insulating tubes 36 and 57 as in the case of the first example which was described earlier. Moreover, since the outer tube 57 is formed integrally with the insulator 11, it becomes possible in connection with the heater installation to make an insertion in the state of the heater 32 and plate 34 being held in the inner tube 31 by means of the middle tube 36. Because of this, the outer tube 57 has a positioning effect, thereby making it further easier to install or incorporate the heater.

The rough working of the inner peripheral surface of the inner tube 31 in this example promotes the thermal efficiency.

Figure 4:
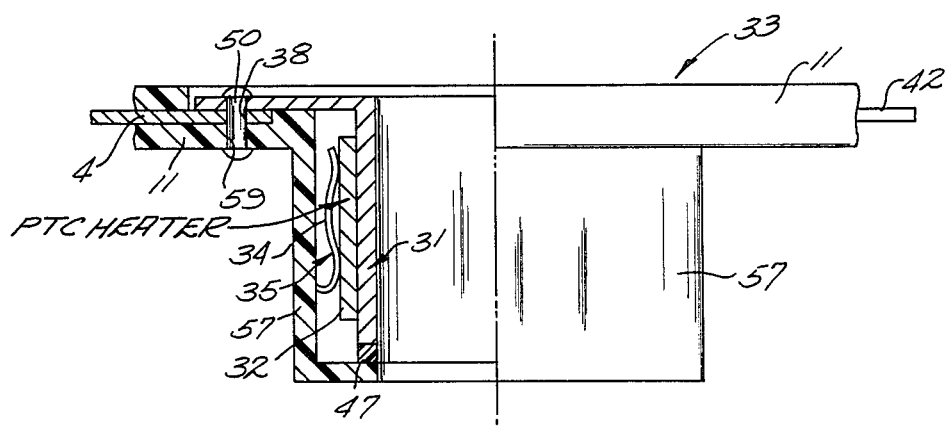

FIG. 4 shows another example of this invention. In this example, the outer tube 57 is integrally formed with the insulator 11 as in the example which is shown in FIG. 3, with a consequence that the thermal efficiency of the heater 32 that is fixed to the inner tube 31 has been improved and the operation of its installation is also improved. Even though an adiabatic middle tube 36 which has been described above is not provided, the heat dispersion outside is prevented to a substantial degree by the presence of the outer tube 57 (which is integral with the insulator 11) even in this case.

In the above, this invention has been explained on the basis of the examples. The above-described example of this invention can be modified on the basis of the technical concept of this invention.

For instance, the shape and structure of the heater itself can be modified variously and, accordingly, the various constituent parts may also be suitably modified. The method of fixing the heater, the number of the heaters used, and the method of their connection to the terminals, etc. can be changed. The shapes and materials of the middle tube and outer tube are not limited to those described above.

In the case of the inner tube, it is better for the same to be made of a metal. Except for the fact that its inner surface is made rough, the inner tube itself may be made of a sintered product, thereby making the inner peripheral surface, at least, porous with a large heat conductive surface.

Further, this invention may be used, of course, in the carburetors of a structure and formula other than those described above. Otherwise, it can also be used in the heating of the fuel for internal combustion engines other than gasoline.

As has been described above, an electrically and thermally insulating middle tube is provided in this invention on the entire periphery in such a manner as to cover the heater completely and the entire periphery of this middle tube is so made as to be covered by the outer tube in an electrically insulating manner, with a result that it becomes difficult for the heat of the heater to be dispersed outside. Because of this, it becomes possible to satisfactorily carry out the heating of the fuel that runs through the flow route on the side of the inner periphery, thereby improving the thermal efficiency.

Since, further, the aforementioned outer tube which has been provided on the entire periphery of the inner tube is formed integrally with the thermally insulating member on the peripheral area, it becomes possible to effect the insertion into the outer tube so that the heater and electrode are held by the inner tube in connection with the installation of the device. Accordingly, the outer tube has a positioning effect, thereby making it easier for the installation or incorporation of the device to take place.

This invention includes all modifications and equivalents of the above-described embodiments following within the scope of the appended claims.

We claim:

1. A fuel heating device comprising an electroconductive inner tube having an inner surface defining a passageway for fuel that is to be heated, means for electrically connecting said inner tube to a source of electrical power, an electric heater fixed in electrical contact with an outside surface of said electroconductive inner tube, a resilient electrode electrically contacting an outer surface of said heater, means for electrically connecting the electrode to a source of electrical power, a first electrically and thermally insulating outer tube surrounding the entire outer periphery of the aforementioned electroconductive inner tube in such a manner as to cover the aforesaid heater completely with said electrode compressed against said heater, and a second electrically and thermally insulating outer tube surrounding the entire outer surface of said first outer tube, said second outer tube including means for mounting the device.

2. A fuel heating device according to claim 1 wherein a plurality of heaters are fixed to the outside surface of said inner tube and spaced around the outer periphery thereof, the electrode comprises a resilient member which extends around the outside surface of said heaters and electrically contacts each heater, said first electrically and thermally insulating outer tube compresses the electrode against each of said heaters on the electroconductive inner tube, and said means for mounting the device for use comprises a flange member integrally formed with said second outer tube at one end thereof.

* * * * *